United States Patent
Henry et al.

(10) Patent No.: US 7,079,275 B2
(45) Date of Patent: Jul. 18, 2006

(54) METHOD AND SYSTEM FOR FACILITATING PAPER TO ELECTRONIC COMMUNICATIONS

(75) Inventors: Matthew K. Henry, San Francisco, CA (US); Christopher L. Fortescue, San Francisco, CA (US)

(73) Assignee: MongoNet, San Francisco, CA (US)

( * ) Notice: Subject to any disclaimer, the term of this patent is extended or adjusted under 35 U.S.C. 154(b) by 198 days.

(21) Appl. No.: 10/160,445

(22) Filed: May 28, 2002

(65) Prior Publication Data

US 2003/0020959 A1 Jan. 30, 2003

Related U.S. Application Data

(63) Continuation-in-part of application No. 10/155,808, filed on May 24, 2002, which is a continuation of application No. 09/537,820, filed on Mar. 28, 2000, now Pat. No. 6,424,426.

(51) Int. Cl.
*G06F 15/00* (2006.01)

(52) U.S. Cl. ............... 358/1.15; 358/407; 379/100.07; 379/100.08; 379/100.09

(58) Field of Classification Search ............... 358/1.15, 358/407, 402, 440, 448, 434; 379/100.01, 379/100.06, 100.07, 100.08, 100.15, 100.17, 379/100.02, 100.09, 100.13, 93.24; 382/317
See application file for complete search history.

(56) References Cited

U.S. PATENT DOCUMENTS

| 4,893,333 A | 1/1990 | Baran et al. |
|---|---|---|
| 5,115,326 A | 5/1992 | Burgess et al. |
| 5,193,110 A | 3/1993 | Jones et al. |

(Continued)

FOREIGN PATENT DOCUMENTS

| EP | 0465011 A | 1/1992 |
|---|---|---|
| WO | WO96/41463 A | 12/1996 |
| WO | WO 96/41463 | * 12/1996 |
| WO | WO98/53603 A | 11/1998 |
| WO | WO99/56459 | 11/1999 |
| WO | WO 00/05654 | 2/2000 |
| WO | WO00/78035 A | 12/2000 |

OTHER PUBLICATIONS

Emert, "Web Ad Spending Passes Outdoor Medium," San Francisco, Chronicle, May 4, 1999.
Ferguson, "The technology that won't die," Forbes, Apr. 5, 1999.
Lieberman, "Panasonic Machine Sends Faxes over the Internet," Computer Peripherals, Electronic Engineering Times, Nov. 10, 1997. Net Returns, "All for One and One for All,", The Industry Standard. Aug. 16–23, 1999, p. 120.

(Continued)

*Primary Examiner*—Kimberly Williams
*Assistant Examiner*—Tia Carter
(74) *Attorney, Agent, or Firm*—Townsend and Townsend and Crew LLP

(57) ABSTRACT

A facsimile/email communication system for providing a user the ability to send emails from any standalone facsimile machine. The system does not require any additional hardware or software to be installed on equipment being used by a sender. The system further provides a user the ability to logon to a centralized web server and send facsimiles to any standalone fax machine. According to one aspect, the system receives a facsimile from a facsimile machine. The facsimile includes an email cover page having the email address of the intended recipient of the facsimile. The email address is extracted from the email cover page by optical character recognition. The facsimile is then converted into an email with the proper email format. The email is then transmitted to the extracted email address.

73 Claims, 11 Drawing Sheets

U.S. PATENT DOCUMENTS

| | | | |
|---|---|---|---|
| 5,247,591 A * | 9/1993 | Baran | 382/179 |
| 5,339,156 A | 8/1994 | Ishii | |
| 5,386,297 A | 1/1995 | Tanaka et al. | |
| 5,461,488 A * | 10/1995 | Witek | 358/402 |
| 5,513,254 A | 4/1996 | Markowitz | |
| 5,515,176 A | 5/1996 | Galen et al. | |
| 5,767,985 A | 6/1998 | Yamamoto et al. | |
| 5,790,639 A | 8/1998 | Ranalli et al. | |
| 5,841,550 A | 11/1998 | Johnson | |
| 5,848,413 A * | 12/1998 | Wolff | 707/10 |
| 5,873,077 A | 2/1999 | Kanoh et al. | |
| 5,881,233 A | 3/1999 | Toyoda et al. | |
| 6,009,150 A | 12/1999 | Kamel | |
| 6,014,502 A * | 1/2000 | Moraes | 709/219 |
| 6,020,980 A * | 2/2000 | Freeman | 358/402 |
| 6,023,345 A | 2/2000 | Bloomfield | |
| 6,025,931 A * | 2/2000 | Bloomfield | 358/402 |
| 6,061,502 A * | 5/2000 | Ho et al. | 358/1.15 |
| 6,101,244 A * | 8/2000 | Okada | 379/100.08 |
| 6,104,500 A * | 8/2000 | Alam et al. | 358/1.15 |
| 6,124,939 A * | 9/2000 | Toyoda et al. | 358/1.15 |
| 6,157,706 A * | 12/2000 | Rachelson | 379/100.08 |
| 6,266,160 B1 * | 7/2001 | Saito et al. | 358/407 |
| 6,356,356 B1 * | 3/2002 | Miller et al. | 358/1.15 |
| 6,374,246 B1 * | 4/2002 | Matsuo | 707/10 |
| 6,424,426 B1 * | 7/2002 | Henry | 358/1.15 |
| 6,594,032 B1 * | 7/2003 | Hiroki et al. | 358/1.15 |
| 6,600,750 B1 * | 7/2003 | Joffe et al. | 370/401 |
| 6,625,642 B1 * | 9/2003 | Naylor et al. | 709/206 |
| 6,650,440 B1 * | 11/2003 | Wing | 358/402 |
| 6,707,580 B1 * | 3/2004 | Bloomfield | 358/402 |
| 6,781,721 B1 * | 8/2004 | Toyoda et al. | 358/402 |
| 6,801,546 B1 * | 10/2004 | Yoshida et al. | 370/490 |

OTHER PUBLICATIONS

Liebmann, Market Focus: Fax Over IP, "As long distance rates drop, IP fax vendors lose their advantage over traditional faxing. But with a bit of redefinition and value adding, the vendors are sticking around,—Rethinking IP Fax" Network Magazine, pp. 70–74.

Newsome, "Some Facts On Free Online Fax Services," Inv. Bus. Daily Jul. 2, 1999.

Norr, "The Pitch for Free Internet Fax Services," San Francisco Chronicle, Apr. 1, 1999.

* cited by examiner

Mongo Net

Send E-mail from a fax machine free service from MongoNet
* Fill in e-mail address(es) in the boxes below
* Use this page as your fax cover sheet
* Fax for free to 1(800)345-8765

Use capital (uppercase) letters. Handprint each letter, number and symbol as in the sample below:

| A | B | C | D | E | F | G | H | I | J | K | L | M | N | O | P | Q | R | S | T | U |
|---|---|---|---|---|---|---|---|---|---|---|---|---|---|---|---|---|---|---|---|---|
| V | W | X | Y | Z | 1 | 2 | 3 | 4 | 5 | 6 | 7 | 8 | 9 | 0 | @ | _ | - | . | # | |

To: (Write e-mail address here, keep each letter in the center of the box and use dark ink)

☐☐☐☐☐☐☐☐☐☐☐☐☐—61

@☐☐☐☐☐☐☐☐☐☐☐☐☐—63

Cc: (optional second e-mail address)

☐☐☐☐☐☐☐☐☐☐☐☐☐—61

@☐☐☐☐☐☐☐☐☐☐☐☐☐

Cc: (optional third e-mail address)

☐☐☐☐☐☐☐☐☐☐☐☐☐—61

@☐☐☐☐☐☐☐☐☐☐☐☐☐

Freehand Notes and Drawings:

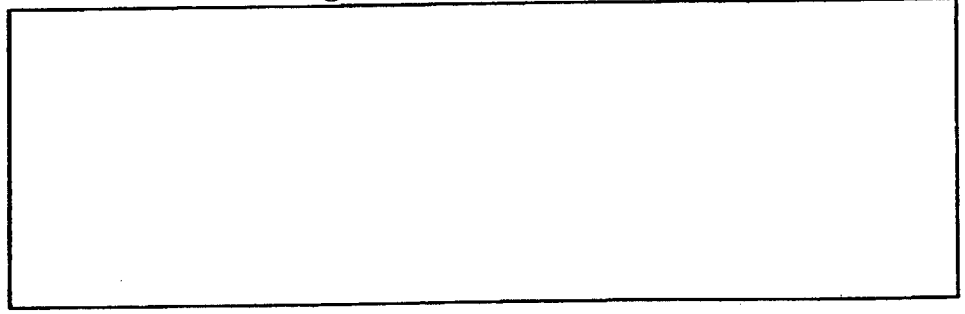

GET: Traffic and weather ☐  map ☐  movies ☐  restaurants ☐  stocks ☐  news ☐

Disclaimer: blah-blah-blah. Blah blah. Blah blah. ah. Blah Blah. Blah. Blahblahblah.

*FIG. 4.*

MongoFax Confirmation Page:

Your transmission was sent to the following e-mail address(es) or fax number(s)
E-Mail: john_doe@generic.com
E-Mail: jane_doe@generic.com
Fax #: (415) 555.5555

If any of these addresses or fax numbers are incorrect,
please carefully fill out a new e-mail
address page and re-send.

Tear along dotted line.       Tear along dotted line.
_ _ _ _ _ _ _ _ _ _ _ _ _ _ _ _ _ _ _ _ _ _ _ _ _ _ _ _ _

Advertisement

Dream Vacations

Presents the chance to enter to win a free, 14 day sailing trip in the British Virgin Islands! Just fax back this request with your name and phone number indicated below, or take this coupon into a local travel agent.

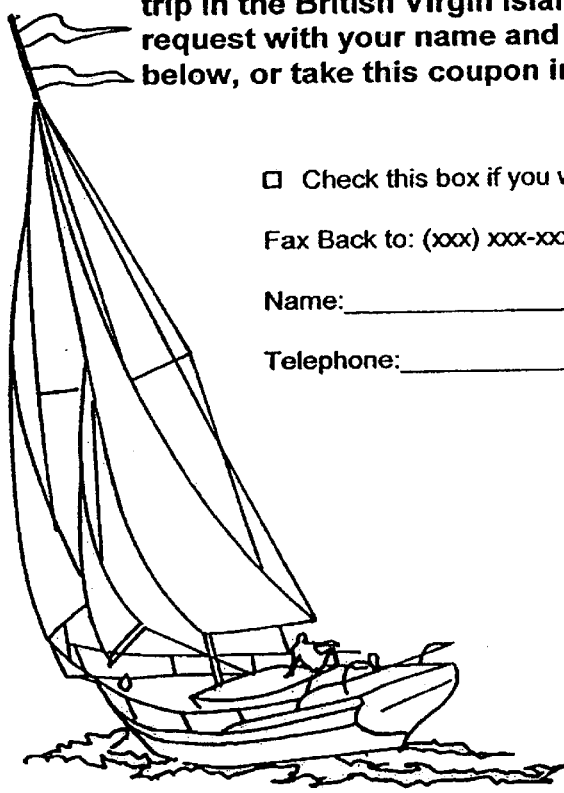

☐ Check this box if you would like to be entered to win.

Fax Back to: (xxx) xxx-xxxx

Name:_____

Telephone:_____

Your personal ID code is: 78W9ZST

FIG. 6A

METHOD AND SYSTEM FOR FACILITATING PAPER TO ELECTRONIC COMMUNICATIONS

CROSS-REFERENCES TO RELATED APPLICATIONS

The present application is a continuation-in-part application from co-pending, commonly assigned U.S. patent application Ser. No. 10/155,808 filed on May 24, 2002, entitled "FAX-TO-EMAIL AND EMAIL-TO-FAX COMMUNICATION SYSTEM AND METHOD" by Henry, which is a continuation application of U.S. patent application Ser. No. 09/537,820 filed on Mar. 28, 2000, now U.S. Pat. No. 6,424,426 entitled "FAX-TO-EMAIL AND EMAIL-TO-FAX COMMUNICATION SYSTEM AND METHOD" by Henry, the disclosures of both of which are hereby incorporated by reference in their entirety for all purposes.

BACKGROUND OF THE INVENTION

The present invention relates to a facsimile (fax)/electronic mail (email) communication system. More particularly, the present invention provides for, among other things, sending and/or receiving emails, web page downloads and faxes from any standalone fax machine. A web page is a file written in hypertext markup language (HTML) and which is stored on a web server. It may also refer to images that appear as part of the page when it is displayed by a web browser.

Fax images can be moved over the Internet by converting fax signals having a fax format to an email format (e.g. RFC-822). Once the conversion is completed, the email is then transferred over the Internet to the intended destination according to the Simple Mail Transfer Protocol (SMTP) or similar protocol. The Internet is the worldwide network of networks based on the TCP/IP (Transmission Control Protocol/ Protocol). Currently, there are various subscriber based service that permit a subscriber to send fax images over the Internet.

According to one type of service, offered by companies such as eFax, Jfax, CallWave and Telebot, a subscriber is provided with a unique telephone number. Any documents faxed to that number are converted to email format and transferred to the subscriber's email inbox. One drawback of this type of service is that it requires the subscriber to have a specific telephone number associated with their email address. A second drawback is that the subscriber must distribute the personal fax telephone number to any persons who would potentially want to send a fax to the subscriber. Finally, this type of service is expensive to operate from the service provider's perspective since the costs associated with buying and operating so many individual and dedicated phone numbers is very high.

Another type of service is the service offered by UUNET, which requires a subscriber to attach additional hardware between the subscriber's fax machine and the service's network. The purpose of this service is to reduce long distance faxing costs for high volume users. The UUNET system converts a fax to the equivalent of an email and then routes the email over UUNET's network to the nearest UUFAX server. The UUFAX server converts the email back to fax format and transmits the fax using a local call to the fax machine at the destination. A drawback of this type of service is that it takes time and up-front hardware additions and expenditures to have access to the service.

Hence, it would be desirable to provide a method and system that is capable of efficiently converting a facsimile to an e-mail.

SUMMARY OF THE INVENTION

Generally, the present invention comprises a facsimile/email communication system and method, whereby a user is able to send emails from any standalone facsimile machine and is also able to send facsimiles to any standalone fax machine, from either a centralized web server or a client machine connected to the Internet.

According to one aspect of the invention, a system for communicating an email from a facsimile is provided. An exemplary embodiment of this system comprises: a facsimile server configured to receive, from a start location, a facsimile in a facsimile image format, the facsimile including an email address; a character recognizer in communication with the facsimile server and configured to extract the email address; a first format converter configured to receive the facsimile and convert the facsimile to an email in an email format; an email server configured to receive the email and extracted email address and transmit the email to an end location identified by the email address; and an advertisement server configured to generate a confirmation page incorporating an advertisement on the confirmation page.

According to a second aspect of the invention, a method of communicating an email from a facsimile is provided. An exemplary embodiment of this method comprises the steps of: receiving a facsimile in a facsimile image format from a start location, the facsimile including an email address; extracting the email address from the facsimile; converting the facsimile image format to an email having an email format; and generating a confirmation page having an advertisement therein.

According to a third aspect of the invention, a system for communicating between facsimile and email is provided. An exemplary embodiment of this system comprises: a network operating center; and a plurality of geographically distributed points of presence in communication with the network operating center, each point of presence having, a facsimile server configured to receive, from a start location, a facsimile in a facsimile image format, the facsimile including an email address; a character recognizer in communication with the facsimile server and configured to extract the email address; a first format converter configured to receive the facsimile and convert the facsimile to an email in an email format; an email server configured to receive the email and extracted email address and transmit the email to an end location identified by the email address; and an advertisement server configured to generate a confirmation page incorporating an advertisement on the confirmation page.

According to a fourth aspect of the invention, a system for communicating a facsimile from an email is provided. An exemplary embodiment of this system comprises: a network operating center having a web server to which a user can log on to over the Internet to compose an email, the web server configured to capture a facsimile number contained within the email; and a plurality of geographically distributed points of presence in communication with the network operating center, each point of presence having, an email server configured to receive the email in an email format; a first format converter in communication with the email server and configured to convert it into a facsimile having a facsimile image format; an advertisement server having a return facsimile page composer and configured to generate a return facsimile page incorporating an advertisement; a second format converter configured to receive and convert the facsimile and return facsimile page to a facsimile encoded bitmap image; and a fax spooler configured to receive the facsimile encoded bitmap image and transmit it to a destination identified by the facsimile number.

According to a fifth aspect of the invention, a method of communicating a facsimile from an email is provided. An exemplary embodiment of this method comprises the steps of: logging onto a web server of a network operating center; composing an email having a facsimile number therein; capturing the facsimile number; converting the email to a facsimile; generating a return facsimile page; incorporating an advertisement in the return facsimile page; and sending the facsimile and return facsimile page to a destination identified by the facsimile number.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings. Like reference numbers indicate identical or functionally similar elements.

BRIEF DESCRIPTION OF THE DRAWINGS

FIG. 4 is an exemplary illustration of an email cover page received from the POP of FIG. 2;

FIG. 6A is an exemplary illustration of a fax-to-email confirmation page received from the POP of FIG. 2;

DETAILED DESCRIPTION OF THE INVENTION

Figure 1:
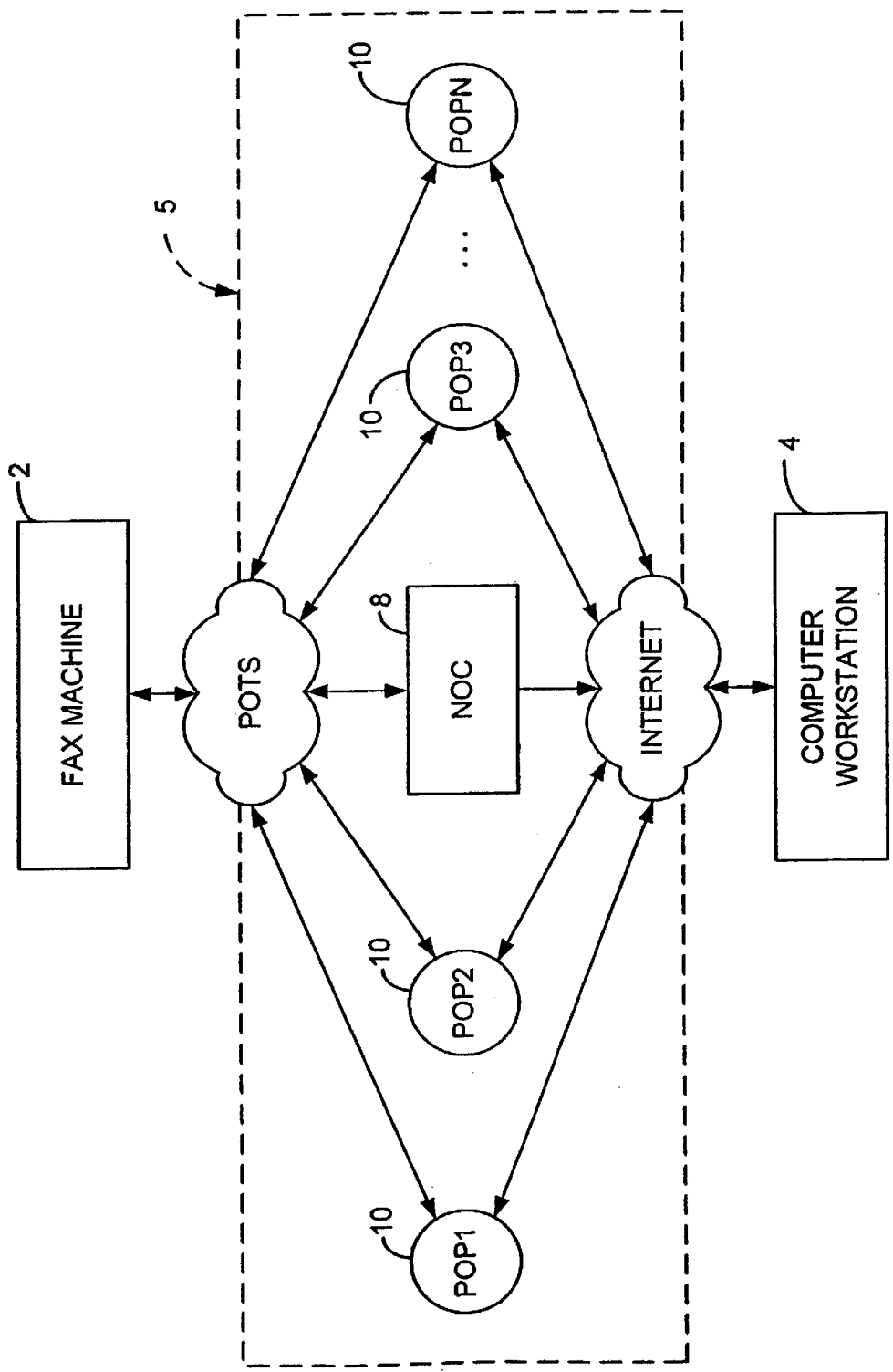
FIG. 1 is a simplified block diagram of a system according to an exemplary embodiment of the present invention.

The present invention in the form of one or more exemplary embodiments will now be described. FIG. 1 is a high-level block diagram of a facsimile/email communication system 5 according to one embodiment of the present invention. System 5 comprises a network operations center (NOC) 8, selectively coupled to both the Plain Old Telephone System (POTS) and the Internet, and a plurality of Points of Presence (POPs) 10 selectively coupled to NOC 8 via the POTs and the Internet. The "Internet," as meant here, means the worldwide network of networks based on the TCP/IP protocol and all means of access thereto (e.g. a local area network having an email system and being coupled to the Internet). (TCP/IP stands for "Transmission Control Protocol/ Protocol" and is a language governing communication between all computers on the Internet.)

As will be explained in detail below, system 5 permits a user to, among other things, send an e-mail from any standalone fax machine 2 and receive faxes from a fax or email sender without having to distribute a unique and predefined fax number to the fax or email sender. Here, it should be emphasized that the fax machine 2, as shown in FIG. 1, is only a working example. In other words, fax machine as it is used in the context of the present invention may also comprise any facsimile protocol compliant communication device or any other scanning device. Similarly, computer workstation 4, in FIG. 1, is only a working example. In other words any device that is capable of sending an email may be used instead of computer workstation 4.

Figure 2:
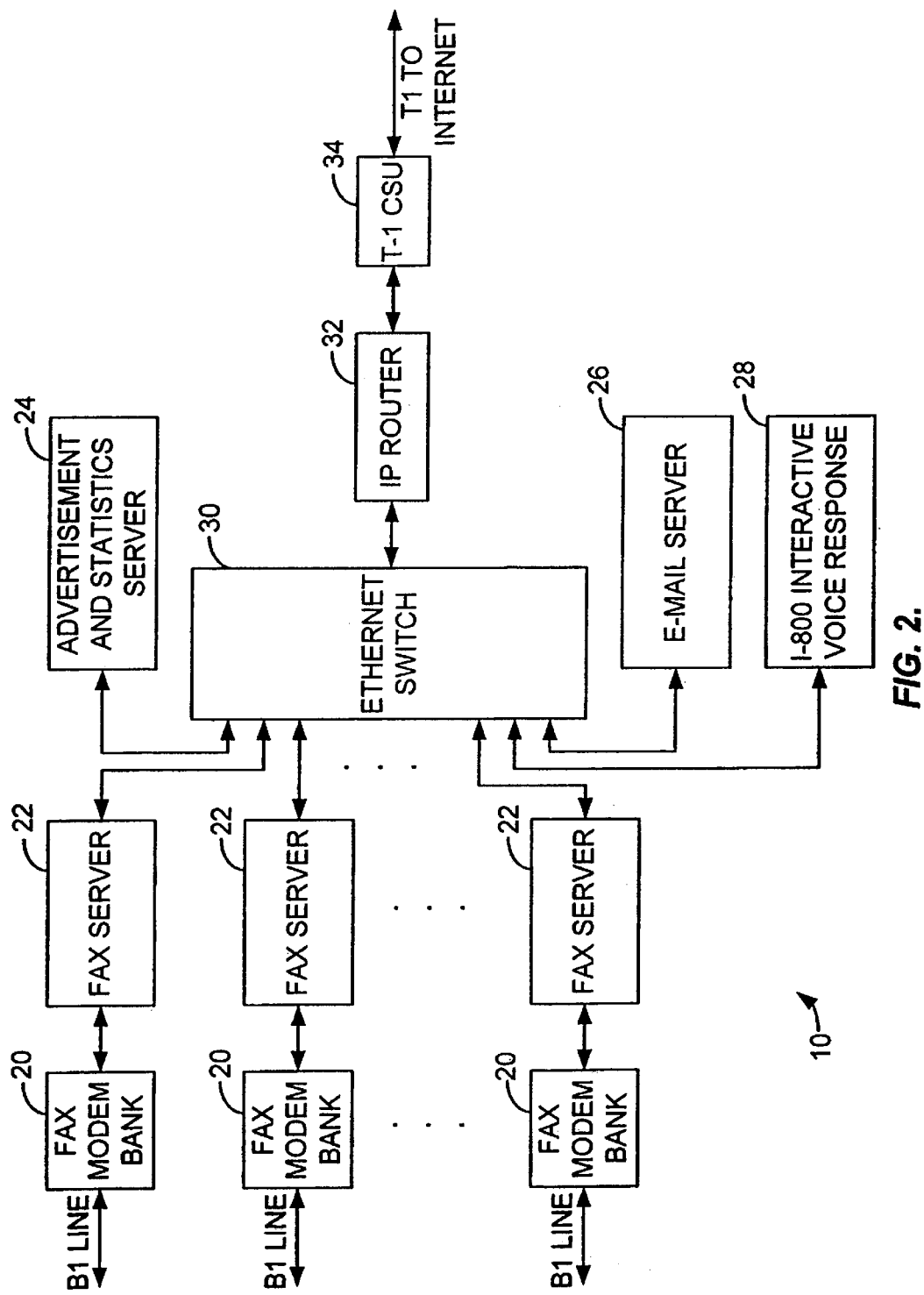
FIG. 2 is a simplified block diagram showing a hardware configuration of a Point of Presence (POP) providing a fax/email interface according to an exemplary embodiment of the present invention.

POPs 10 are distributed over a wide geographic area, for example, the United States or throughout the world. An exemplary embodiment of a POP 10 is shown in FIG. 2. POP 10 comprises one or more fax modem banks 20; one or more fax servers 22; an advertisement and statistics (ad/stat) server 24; an email server 26; an interactive voice response (IVR) unit 28; an Ethernet switch 30; an IP router 32; and a T-1 channel service unit (CSU) 34. It should be emphasized that the embodiment of POP 10 in FIG. 2 is only exemplary. For example, other configurations are within the spirit and scope of the present invention, including but not limited to use of higher-capacity Internet access lines (e.g. T-3), provision for multiple switched email servers, etc. FIGS. 1 and 2 will be described in further detail in the context of the description presented below.

Figure 3A:
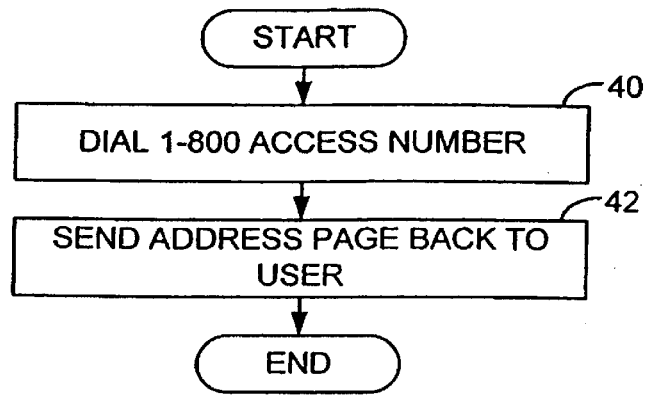
FIG. 3A is an illustration of a process of obtaining an email cover page, according to an exemplary embodiment of the present invention.

Referring now to FIG. 3A, there is shown an illustration of how a user obtains an "email cover page" from a fax server 22, according to an exemplary embodiment of the present invention. At step 40, the user dials a specific toll-free (e.g. 1-800) fax-back number from any fax machine or telephone. It should be understood that this fax-back number is not limited to a toll-free telephone number but may include any other type of telephone number as well. This fax-back number is routed by the telephone network via the POTS to a POP 10, based on the user's geographic locale. As shown in FIG. 2, fax modem bank 20 of POP 10 receives the fax over, for example, a B-1 line, which comprises 24-line telephone bundle. Then, at step 42, POP 10 sends a blank "email cover page" back to the user with further instructions on how to send an email from the user's fax machine.

The email cover page looks like a normal fax cover sheet, but it contains lines of blank character boxes and a local telephone number the user can use so that the fax can be sent without the user having to incur any cost. The local telephone number is generated by a table driven translation process through automatic number identification, detectable from outbound 1-800 numbers. In an alternative embodiment each POP 10 of system 5 would be accessible using a single toll-free number. An exemplary email cover page is shown in FIG. 4. In one embodiment the character boxes 61 have "tickmarks" 63 on the edges of each character box 61.

Tickmarks 63 have the effect of coercing the user to enter characters in the character boxes 61 but away from the character box edges. Characters entered away from the character box edges is beneficial, since later in the process, when character recognition is performed, the characters can be identified more accurately.

In one exemplary embodiment, the email cover page further includes a list of special features or options that can be selected by a user. For example, one of the special features or options may be an archive option. If a user checks off this option, an archive copy of the facsimile is automatically generated and archived at a storage location. The storage location may vary depending on the design choice. For example, the storage location can be the sender's own computer system. Some other special features or options may be document format options. For instance, the document to be faxed can be sent as text only within an email, or sent as a Word attachment to an email, or sent as a PDF formatted attachment to an email. Based on the disclosure provided herein, other types of special features or options will be apparent to a person of ordinary skill in the art.

In an alternative exemplary embodiment, the email cover page can be miniaturized to the size of small adhesive note sheets, such as, Post-its. A user can still fill in the requisite information on this miniaturized email cover page. Once completed, this miniaturized email cover page can then be adhered onto the front page of a document for facsimile transmission. Subsequent character recognition can be adjusted to heighten the sensitivity needed to locate and identify the miniaturized email cover page on the front page of the document. Due to the reduced size of the miniaturized email cover page, special markings or symbols, such as a unique bar code, may be included to facilitate the character recognition that needs to be performed to allow the email addresses to be more easily located and identified within the miniaturized email cover page. Miniaturized email cover pages can be sold as peel-off pads. When a document needs to be faxed to an email address, a user simply fills in the requisite information on the miniaturized email cover page, peels off the completed miniaturized email cover page and affixes it on the front page of the document.

In another alternative exemplary embodiment, an electronic version of the email cover page in the form of an electronic file is provided to a user via e-mail or download from a website. In this exemplary embodiment, the electronic file is implemented using PDF format. When implemented in this manner, the electronic file can be activated to generate the email cover page on a computer. The email cover page is then shown to a user. The user can then directly input the desired information onto the email cover page using an input device, such as, a keyboard. Information entered in this manner is more reliable, thereby minimizing the number of errors that might occur when subsequent character recognition is performed. The completed email cover page can then be printed out and faxed with the desired document.

In addition, when an electronic email cover page is used to capture the requisite information, some of the captured information, for example, the email address, can be regenerated on another part of the email cover page. For instance, the email address may be reprinted on another part of the email cover page, or alternatively, the email address may be encoded in bar code form, or other machine-readable format, and then be printed as part of the email cover page. This provides redundancy and further enhances the accuracy of the character recognition that needs to be performed subsequently.

Optionally, certain information on the email cover page may be rendered unreadable to the recipient of the email. For example, the fax number used by the sender may be printed within a grey scale pattern or the like, such as, a moire pattern, in which the fax number is visible to the eye of the sender before the email cover page is faxed. When faxed, however, the fax number and the pattern will not be distinguishable from each other due to the limitations of fax scanning technology thereby rendering the fax number unusable to the recipient.

Figure 3B:
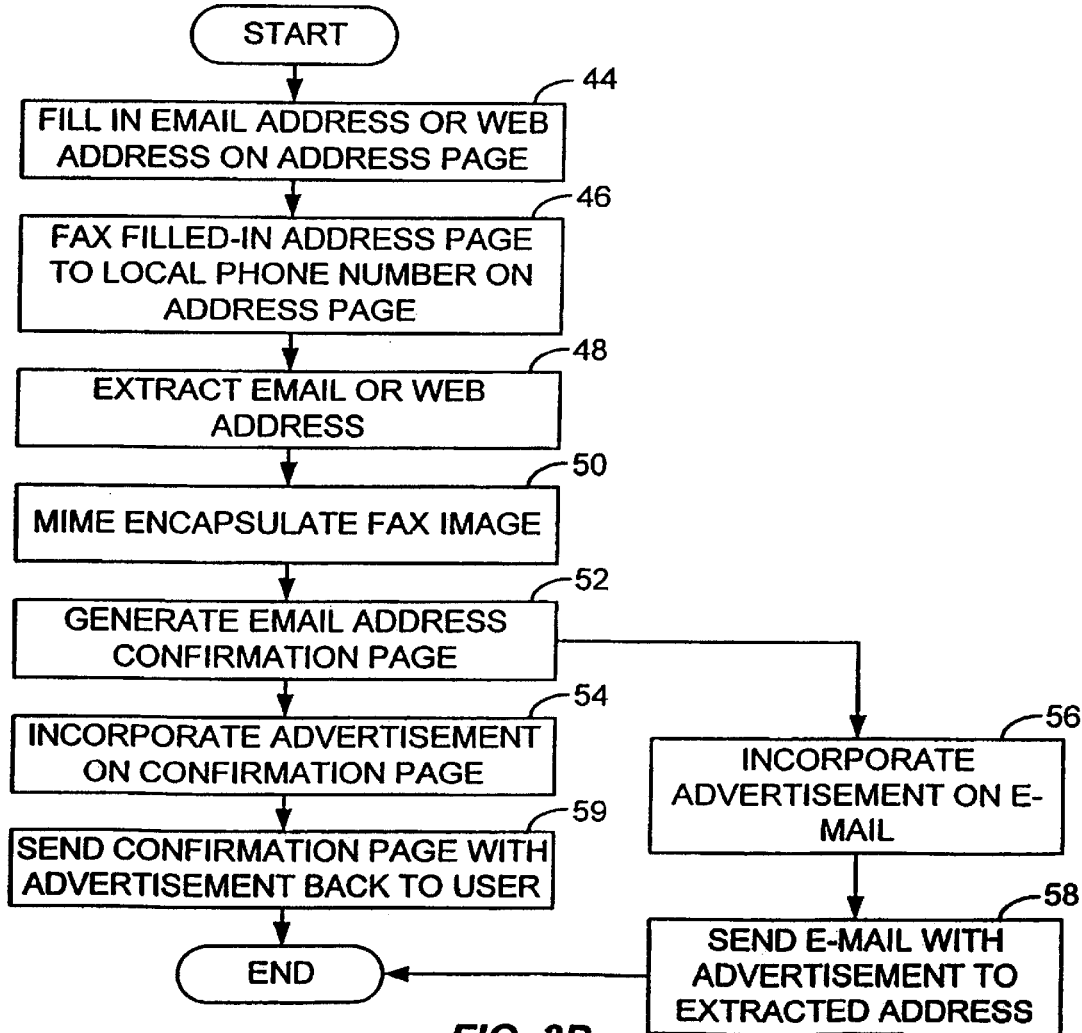
FIG. 3B is an illustration of a process of a user interacting with the system of the present invention to send an email from a fax machine, according to an exemplary embodiment of the present invention.

Referring now to FIG. 3B, there is shown an illustration of how a user interacts with the system 5 of the present invention to send an email from a fax machine, 2 according to an exemplary embodiment of the present invention. At step 44, the user fills in the letterboxes, in normal handwriting, with the final email address(es) it wishes to send to, e.g., "john_doe@generic.com". Alternatively, the email address can be printed in a machine-readable format. In an alternative exemplary embodiment, the email cover page includes an "advanced features page," which can be downloaded to the user's fax or email address. This advanced features page may also be generated at the user's computer. The advanced features page permits the user to select one or more options or services offered by the system 5 such as, for example, creating a group distribution list.

One or more group distribution lists for a particular user can be maintained by the system 5. For example, one or more group distribution lists may be associated with or linked to a particular sender email address. The email addresses within a group distribution list can be stored by the system 5. When filling out the email cover page, the user only needs to provide an alias or other identification information for a particular group distribution list. The system 5 is able to retrieve the sender email address and the alias for the particular group distribution list from the completed email cover page. The system 5 then looks up the group distribution lists associated with the sender email address and determines if the alias is associated with one of the group distribution lists linked to that sender email address. If so, the fax will be forwarded to all the email addresses in that group distribution list.

At step 46, the user sends the fax to the telephone number associated with the selected POP 10, where it is received by a fax modem bank 20 on fax server 22. Fax modem bank 20 includes an incoming fax spooler 60, which converts the fax to an image file format, which may be, for example the standard G3 TIFF format and then temporarily stores the imaged fax in a spool area on a local disk drive (not shown in the figures). The imaged email cover page is then transmitted to one of the fax servers 22 of POP 10 for further processing.

Figure 5:
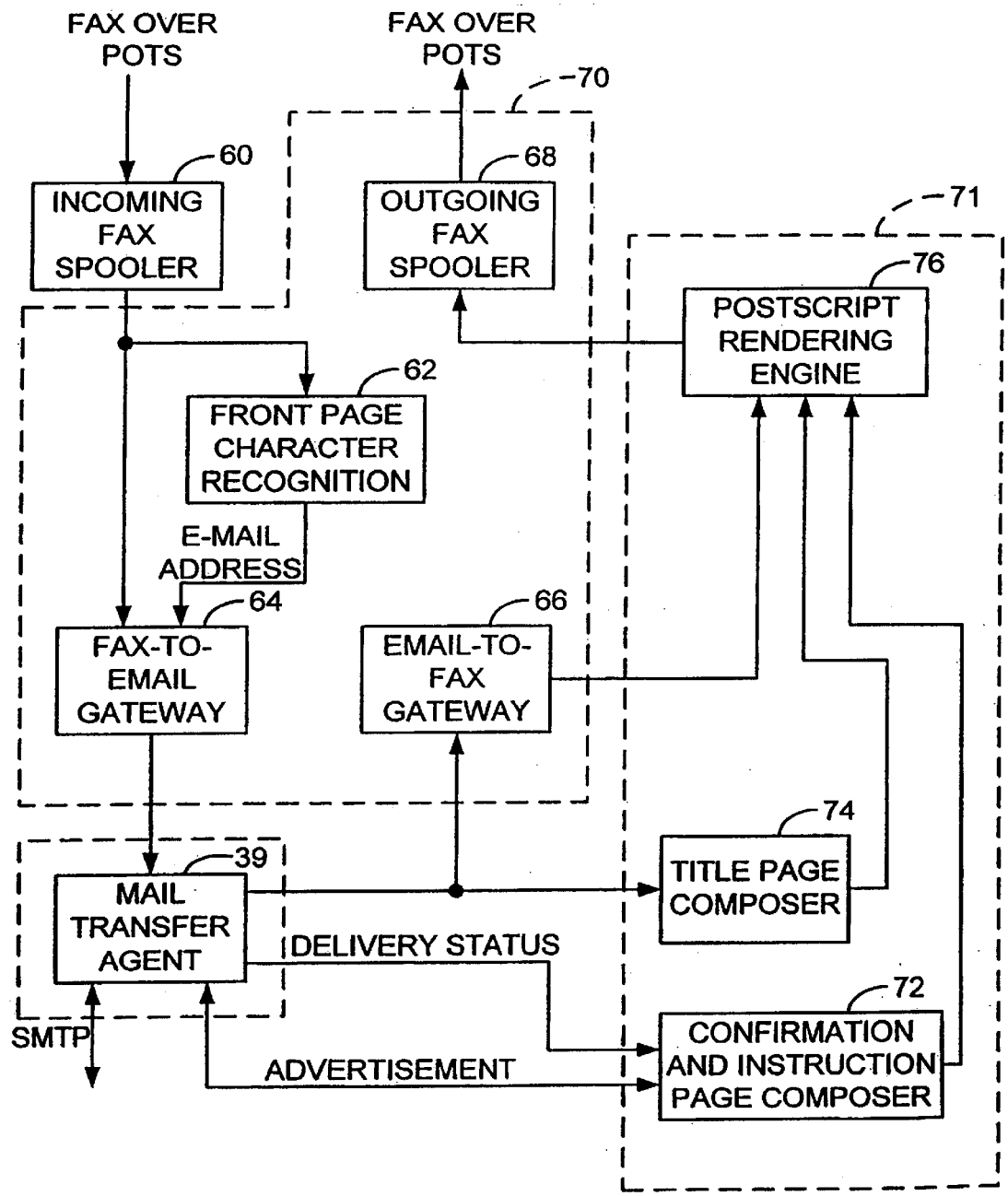
FIG. 5 is a simplified block diagram showing the software architecture of the POP of FIG. 2.

In addition to fax spooler 60, and as is shown in FIG. 5, the software architecture 70 for each fax server 22 comprises a front page (i.e. cover page) character recognition module 62, a fax-to-email gateway 64, an email-to-fax gateway 66 and an outgoing fax spooler 68.

At step 48, front page character recognition module 62 operates to extract the imaged email address from the imaged email cover page. Preferably, front page character recognition module 62 does this by optical character recognition (OCR). Optionally, the imaged email cover page may be cleansed or filtered as many times as is deemed appropriate to remove any undesired markings or patterns before the front page character recognition module 62 is invoked to perform its functions. Furthermore, as described above, the imaged email cover page may include redundant information relating to the imaged email address. The front page character recognition module 62 can be adjusted to cross-check the redundant information to ensure that the imaged email address is accurate.

At step 50, the electronic image of the fax is encapsulated and formatted into a MIME-compliant email message by fax-to-email gateway 64. "MIME" stands for Multipurpose Internet Mail Extensions and refers to an official Internet standard that specifies how email messages must be formatted so that they can be exchanged between different email systems. The electronic image of the fax is then transmitted to email server 26 as an attachment to the email. In an alternative exemplary embodiment, certain information is removed from the electronic image of the fax before it is transmitted to email server 26. For example, the specific fax number that is used by the sender may be scrubbed or otherwise rendered unreadable by the recipient of the email.

Upon receipt of the fax image by email server 26, email server 26 transmits the delivery status of the email to advertisement and statistics server (ad/stat server) 24. As shown in FIG. 5, the software architecture 71 of ad/stat server 24 comprises a confirmation and instruction page composer 72, a title page composer 74 and a PostsScript rendering engine 76. Confirmation and instruction page composer 72 receives the delivery status of the email from email server 26 and subsequently generates delivery or non-delivery notifications and user instruction pages in PostScript format.

In an alternative exemplary embodiment, email server 26 and/or ad/stat server 24 may include a real-time billing engine (not shown). The real-time billing engine is used to keep track of usage by various users and generate the appropriate billing information accordingly. Usage may be tracked in a number of different ways. For example, usage may be tracked via minutes used against a specific fax number. In that regard, a user, such as a company, may be assigned one or more specific fax numbers for use by its employees. Usage against each specific fax number may be monitored by the real-time billing engine. Billing information may be calculated on a real-time basis and made available to authorized users via a website on the Internet. In addition, the billing information for each fax sent may also be included in a confirmation and instruction page as described below.

Figure 6B:
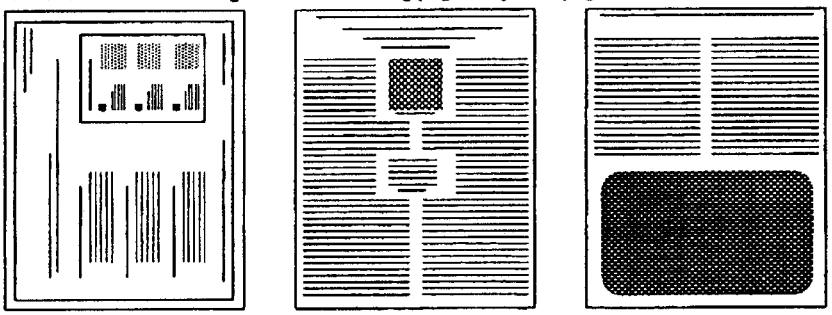
FIG. 6B is another exemplary illustration of a fax-to-email confirmation page received from the POP of FIG. 2.

At step 52, confirmation and instruction page composer 72 generates a confirmation and instruction page, and, at step 54, retrieves advertisements from ad/stat server 24 and incorporates the advertisements into the confirmation and instruction page. Additionally, at step 56, confirmation and instruction page composer 72 retrieves advertisements from ad/stat server 24, which are incorporated, e.g. in banner format into the email. Preferably, the advertisements incorporated in the confirmation and instruction page are specifically targeted to the user's geographic locale. The system 5 determines the user's geographic locale from the user's fax number's prefix and area code and advertisements are then targeted based on demographic data characteristic of the user's neighborhood, e.g., average income bracket. In an alternative embodiment, the email address confirmation page includes an electronic commerce aspect, wherein the user is provided with a "check box" on the confirmation and instruction page, which the user can check to indicate further interest in a particular advertising offer. An exemplary embodiment of a confirmation and instruction page is shown in FIG. 6A. Optionally, the confirmation and instruction page may further include thumbnail sketches of one or more of the faxed pages, as shown in FIG. 6B.

In yet another alternative exemplary embodiment, a toll-based (e.g. 1-900) number is provided to the user at the beginning of the process, i.e., in lieu of step 10 in FIG. 3A, to provide a user with the option between the free advertising subsidized service described above or a pay-per-use service where the confirmation and instruction page does not incorporate advertisements.

In one alternative exemplary embodiment, upon receipt of the fax image by email server 26, email server 26 contacts ad/stat server 24 to retrieve preferences that may be associated with the email that is to be generated for that fax image. Preferences can be specific format, marketing information, graphics etc. and can be sender-oriented or recipient-oriented. Information from the email cover page, such as, account number, respective sender and recipient email addresses, fax number used by the sender or other unique markings or symbols, can be used to determine the preferences that are to be incorporated into the email. For example, if a fax is received from a sender using a specific fax number, the email to be generated from that fax may include information about that sender. If the specific fax number is dedicated for a particular company, certain company specific marketing information and graphics may be incorporated into the email to provide branding or standard look and feel.

In another alternative exemplary embodiment, the confirmation and instruction page may include dynamic content that is provided based on the sender's historical and/or past activities or behavior. The ad/stat server 24 may keep track of a sender's historical and/or past activities or behavior. For example, the ad/stat server 24 may keep track of the number of times faxes sent by a particular sender failed to go through because of poor handwriting or incorrect recipient email address. The ad/stat server 24 may even keep track of the type of problems that caused past failures, such as, a sender's handwriting of the letters "v" and "u" repeatedly caused faxes to fail to go through. Based on the sender's historical and/or past activities or behavior, the ad/stat server 24 then provides the appropriate information to the email server 26 to be included in the confirmation and instruction page. Such information may include, for example, tips or helpful hints to avoid problematic handwriting.

After the confirmation and instruction page has been composed, it is rasterized into a fax encoded bitmap image by PostScript rendering engine 76 and then sent to fax server 22 where outgoing fax spooler 68 operates to store the rasterized confirmation and instruction page on a local disk drive for subsequent delivery. Because bitmap image rendering is a computationally intensive process, a custom load-sharing software for distributing the rasterization process between a number of fax servers 22 machines may be employed as an alternative embodiment.

In another alternative exemplary embodiment, for promotional or marketing purposes, the email may further include a link that allows a recipient to use the services provided by the system 5 on a trial basis. The recipient/trial user may click on the link and be directed to a website. The website may show the trial user a trial offer and prompt the trial user to enter his/her email address to receive the trial offer. Assuming the trial user decides to take the trial offer and enters his/her email address, an electronic version of the email cover page is forwarded to the provided email address. This email cover page includes a specific fax number that is valid only for trial purposes. For example, this specific fax number may only be used for a limited number of fax transmissions. When the trial user uses the services provided by the system 5, the emails sent by the trial user similarly include links that allow the recipients to try the services, as described above.

At steps 58, the email (with the advertisements) is sent over the Internet to the intended recipient using, for example, SMTP protocol, and as an attachment in a standard format, e.g. GIF file, viewable on the majority of platforms.

In an alternative exemplary embodiment, a link to the email is sent over the Internet to the intended recipient. The link is created dynamically for each email. More specifically, the address for the link is randomly generated for an email on an ad hoc basis. This is done to protect against unauthorized access of the email. The intended recipient may then click on the link to retrieve and view the email.

Optionally, upon the intended recipient clicking on the link and viewing the email, a receipt is generated and forwarded to the sender to confirm that the intended recipient has received the email.

Figure 9:
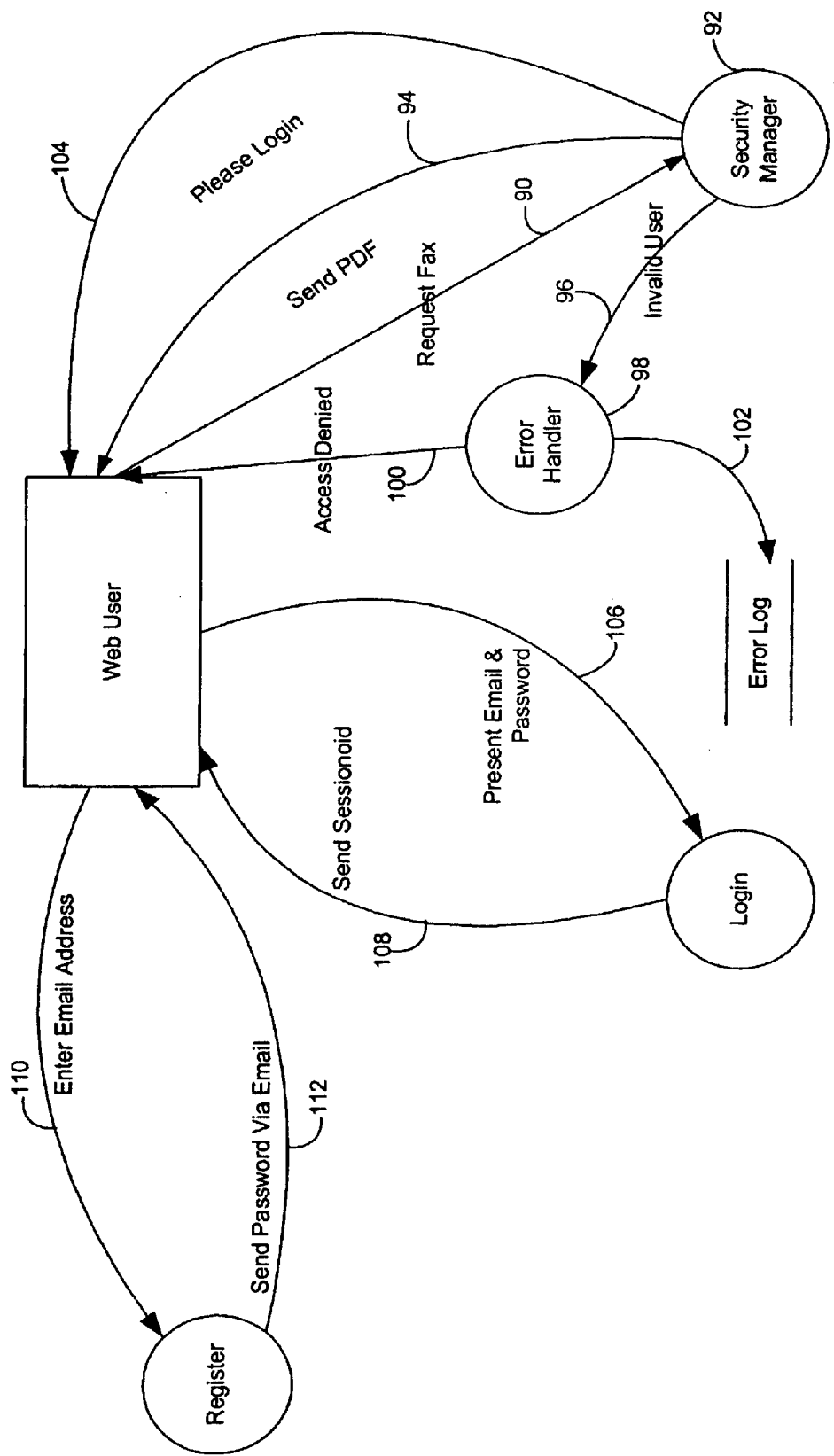
FIG. 9 is a flow diagram illustrating exemplary operations of a security mechanism used to protect against unauthorized access of emails in accordance with an exemplary embodiment of the present invention.

Optionally, when a link is used to access the email over Internet, a security mechanism is provided to allow only authorized access to the email by an intended recipient. FIG. 9 is a flow diagram illustrating exemplary operations of the security mechanism. As shown in FIG. 9, when a user receives a link, at 90, s/he clicks on the link to request access to the email or fax. By clicking on the link, the user in effect contacts a security manager 92 that controls access to the email. If the security manager 92 determines that the user is an authorized recipient, then access to the email is granted and, at 94, the security manager 92 may then send the email to the user. One way to determine that the user is an authorized recipient is for the security manager 92 to first check if the user has logged in with the security manager 92. If the user has logged in with the security manager 92, then certain credentials associated with the user is available. The credentials may include, for example, a session ID which is tied to the email address of the user. The security manager 92 then checks the email address of the user retrieved based on the credentials against the email address of the intended recipient of the email. If the two email addresses match, then the user is an authorized recipient of the requested email.

On the other hand, if the two email addresses do not match, then the user is validly logged on but is not an authorized recipient of the requested email. Then, at 96, the security manager 92 invokes an error handler routine 98. At 100, the error handler routine 98 informs the user that access to the requested email is denied because the user is not an authorized recipient. Optionally, at 102, the error handler routine 98 logs the denied request for archival and/or security purposes.

If the user is not logged in with the security manager 92, then at 104 the security manager 92 prompts the user to login. To login, at 106, the user presents his/her email address and password. The password is given at the time the user registers with the security manager 92. If the email address for the user and the provided password match those maintained by the security manager 92, at 108, the user is considered logged in and credentials such as a session ID are forwarded to the user. Once the user has the credentials, the process as described above can be repeated to determine if the user is an authorized recipient.

If the user is not a registered with the security manager 92, i.e., the user does not have a password associated with his/her email address, the user is then prompted to register with security manager 92. To register with the security manager 92, at 110, the user provides his/her email address. Upon receiving the email address, the security manager 92 generates a password that is linked to that email address and, at 112, forwards the password to the user. The security manager 92 also creates an account for the user for future reference.

Finally, at step 59, the confirmation and instruction page is sent to the user for confirmation purposes, the confirmation and instruction page possibly incorporating an advertisement as explained above. For example, the confirmation and instruction page can be sent over the POTS to the user in the form of a confirmation fax if a fax number for the sender is available; similarly, the confirmation and instruction page can also be sent to the user in the form of a confirmation email or as a part thereof.

In an alternative exemplary embodiment, the confirmation and instruction page may also be sent to other e-mail addresses. For example, if the fax that is sent relates to company business, a confirmation copy of the email generated from that fax may be forwarded to the company's archive or storage facility for storage or archive purposes.

At this point, it should be emphasized that, whereas the software modules of the software architecture of FIG. 5 are shown to be distributed over multiple servers, one skilled in the art would understand that all the software modules could reside on a single server or on different servers than is shown in the embodiment of FIG. 5.

In an alternative exemplary embodiment, a user can interact with the system of the present invention to send a facsimile from any standalone facsimile machine to any other standalone facsimile machine. To do this, the user procures a "facsimile number page," as for example, similar to procuring the "email cover page" described above in relation to steps 40 and 42. The user then enters a facsimile number of the intended facsimile recipient, for example, in handwritten format or printed machine readable format, and then faxes the facsimile to the local number of the selected POP 10 as in steps 44 and 46 described above (or, alternative, enters a pay-per-use toll-based number as is also described above). Upon receipt of the facsimile by the selected POP 10, the facsimile number is then extracted and the electronic image of the facsimile is formatted into a MIME-compliant email message by fax-to-email gateway 64, similar to steps 48 and 50 above. Next, email server 26 transmits the MIME image to an email-to-fax gateway 66, which could reside on a different POP 10, where the email-to-fax gateway 66 converts the MIME image into a text-formatted (e.g. PostScript) file. Then, PostScript rendering engine 96 operates to rasterize the text-formatted file into a fax encoded bit map image. And, finally, outgoing fax spooler 68 receives the fax encoded bit map image and transmits it to the intended facsimile recipient.

In yet another exemplary embodiment of the present invention, webpages can be downloaded via fax. In this embodiment, a user is provided with an "email cover page" as described above. This email cover page provides letterboxes for entering the desired web address (which, for example can be entered in normal handwriting or printed in a machine readable format) and an indicator of some sort, which the user can use to request the number of pages from the web address the user wishes to download. One type of indicator on the cover page, for example, could be a series of bubbles positioned at predetermined positions on the cover page.

Figure 7:
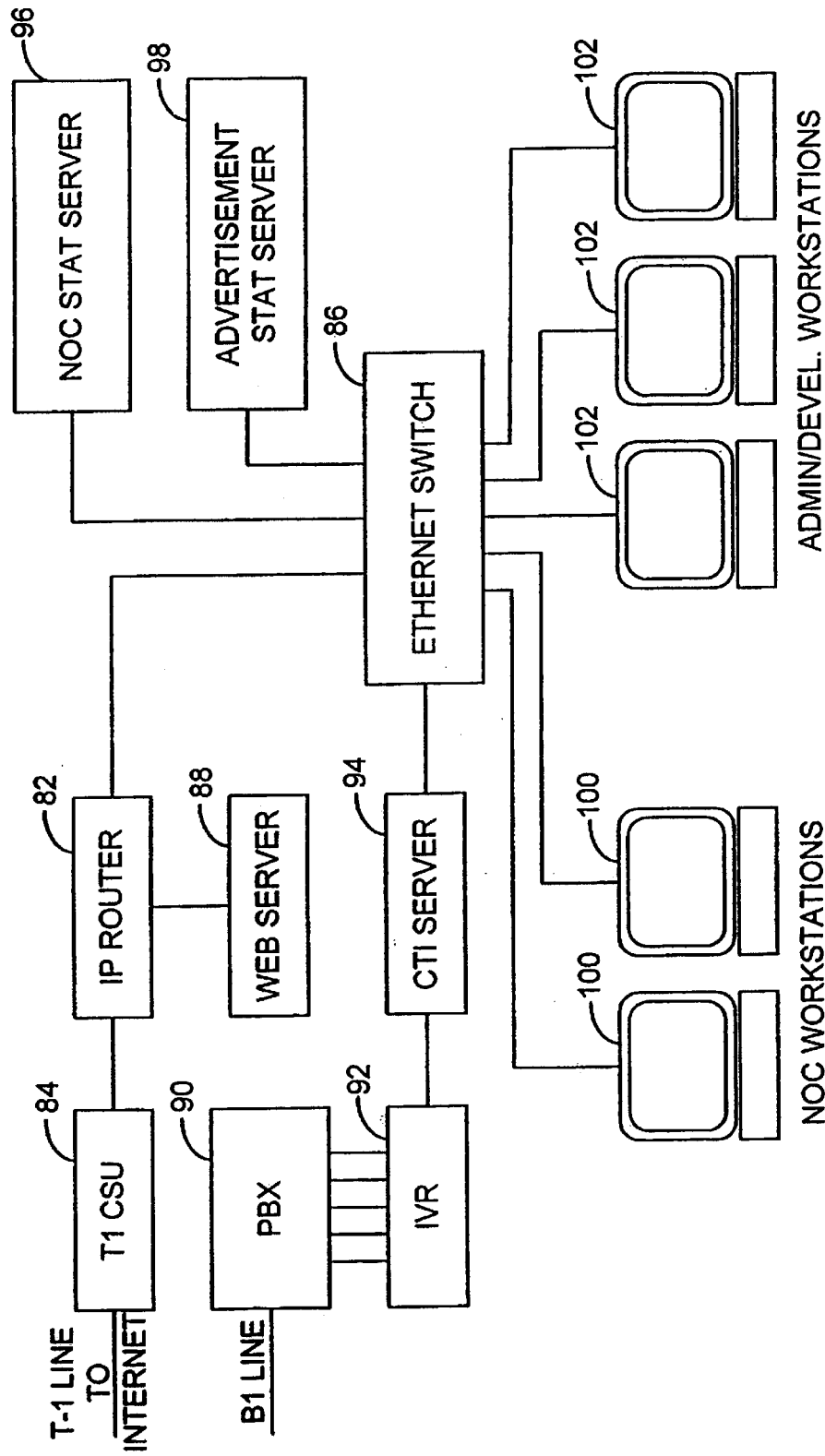
FIG. 7 is a simplified block diagram of a network operations center (NOC)

Referring now to FIG. 7, there is shown a network operations center (NOC) 8, according to an exemplary embodiment of the present invention. NOC 8 functions as the system headquarters and is configured to communicate with all POPs 10, as was shown and described in reference to FIG. 1. NOC 8 comprises an Internet access router and firewall component (IP router) 82 coupled between the Internet via, for example, a T1 channel service unit (CSU) 84 and an Ethernet switch 86 (at a data rate of, for example, 100 Mbps); a web server 88 coupled to IP router 82; a private branch exchange (PBX) 90 coupled to the telephone network via, for example, a B-1 line; an interactive voice response (IVR) unit 92 coupled to PBX 90 and a computer-telephony integrated (CTI) server 94 coupled between IVR unit 92 and Ethernet switch 86. Also coupled to Ethernet switch 86 is an NOC statistics server 96; an NOC advertisement statistics server 98; NOC workstations 100; and administrative/development workstations 102.

NOC advertisement statistics server 98 stores, and makes available to advertisers, statistics relating to the advertiser's advertisement(s), for example, the number of times the advertisement was sent, the number of positive responses from viewers of the advertisement, etc.

NOC administrative/development workstations function as a help desk to those users who log on to web server 88 and also allow the system provider to do development, for example, improving the functionality of the web site provided by web server 88.

IVR unit 92 permits a user to dial into the NOC via PBX 90 using the same 1-800 toll free access number used in the initiation of a fax-to-email process described above. IVR 92 provides user's with voice prompts, which the user can respond to using the telephone keypad. The prompts may relate to, for example, use instructions or may permit a user to download information from the Internet, e.g. stock quotes, weather predictions, travel information, etc.

Figure 8A:
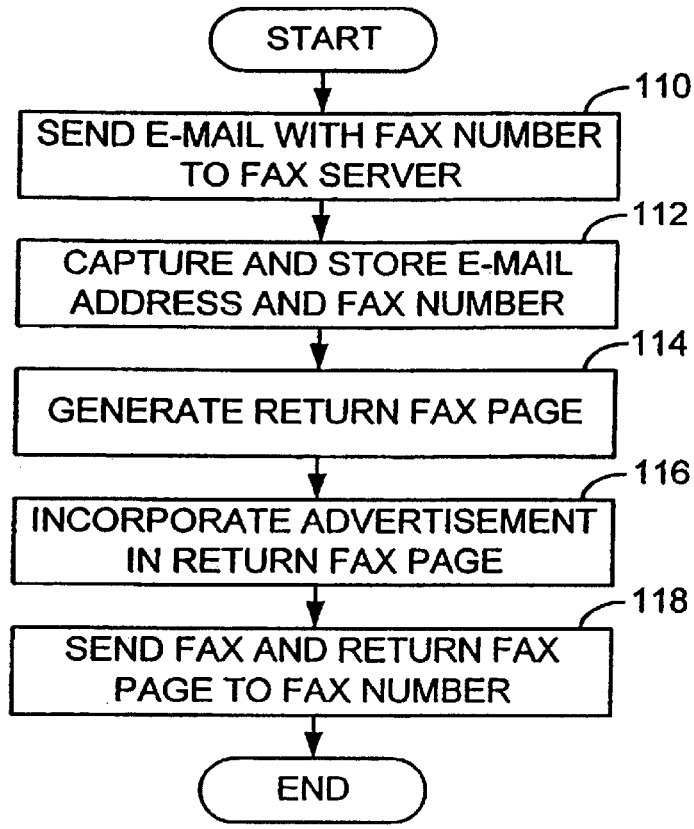
FIG. 8A is an illustration of a process of a user interacting with the system of the present invention to send a fax from an email, according to an exemplary embodiment of the present invention.

In another embodiment of the present invention, a user can logon to web server 88 from, for example, a computer workstation 4 (See FIG. 1), and then send a fax from an email to any standalone fax machine. An exemplary process for accomplishing this is shown in FIG. 8A.

At step 110, after the user logs on to web server 88 (See FIG. 7), the user sends an email to web server 88. Then, at step 112, web server 88 captures and stores the user's email address and the fax number to which the user wishes to send the fax. This information is relayed over the Internet to email server 26 of the, preferably, nearest POP 10, to which the fax number is associated. As shown in FIG. 5, each email server 26 contains a mail transfer agent 39, which accepts the email from NOC 8. Email-to-fax gateway 66 then operates to convert the email message into PostScript text.

At step 114 title page composer 74 generates a return fax page, and, at step 116 retrieves advertisements from ad/stat server 24 and incorporates the advertisements into the return fax page. Preferably, the advertisements are specifically targeted to the fax recipient's location. The system 5 determines this from the recipient's fax number's prefix and area code by comparing the numbers to area code and prefix numbers stored in ad/stat server 24. Once the neighborhood is identified, advertisements are then targeted based on demographic data characteristic of the recipient's neighborhood, e.g., average income bracket. In an alternative embodiment, the return fax page includes an electronic commerce aspect, wherein the fax recipient is provided with a "check box" on the return fax page, which the recipient can check to indicate further interest in a particular advertising offer.

After the return fax page has been composed, it and the converted fax image are rasterized into a fax encoded bitmap image by PostScript rendering engine 76 and then sent to a fax modem bank 20 of POP 10 where outgoing fax spooler 68 operates to store the rasterized fax and return fax page on a local disk drive for subsequent delivery.

At step 118, the fax and return fax page are sent over the POTS to the fax recipient.

Figure 8B:
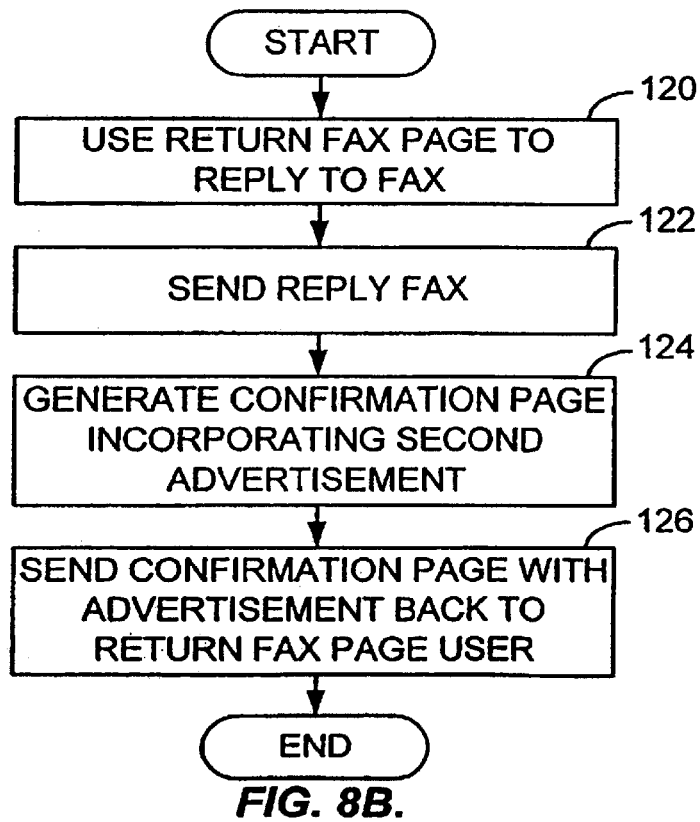
FIG. 8B is an illustration of a reply process wherein a recipient of the fax, delivered in the process according to FIG. 8A, replies to the fax using a return fax page.

Referring now to FIG. 8B, at step 120, upon receipt of the fax and return fax page, the fax recipient uses the return fax page to reply to the fax and sends the reply fax at step 122.

At step 124, title page composer 74 of ad/stat server 24 operates to generate a confirmation page incorporating a second advertisement, which is then, at step 126, sent back to the return fax page user. Steps 124 and 126 substantially follow the steps 54 and 59 as described in reference to the fax-to-email process of FIG. 3B.

The advertising subsidized aspect of the system and method of the present invention also allows a user to send a fax from any standalone fax machine to any other standalone fax machine for free, thereby avoiding long distance telephone charges, which are typically billed for any long-distance fax transmission. To accomplish this, a user simply dials the toll free (1-800) access number, as explained above, to obtain a local number to a POP 10. Local POP 10 then responds by faxing back a cover page to the user. Steps 44 through 48 are then performed, as was described in relation to FIG. 3B, followed by steps 110 through 118 as was described previously in relation to FIG. 8A. The only difference from the process as described above would be to provide letterboxes for fax addresses on the cover page and provide for OCR capability for extracting fax addresses.

In another alternative embodiment of the present invention, NOC 8 includes a local database (not shown in FIG. 7), which is configured to store a frequent user's email address book. The user can logon to web server 88, upload the address book and associate nicknames or real names with each email address (e.g. "John Doe" for john_doe@generic.com). By doing this, the user can then send emails from any standalone fax machine simply by filling in the letterboxes of the email cover page (as described previously with respect to FIG. 3B) with the nickname or real name of the intended recipient. Finally, in another exemplary embodiment of the present invention, advertisers are provided with a "dynamic print advertising" service, whereby an advertiser can logon to web server 88 of NOC 8, open an account, create advertisements and customize them based on specific demographic information.

Figure 10:
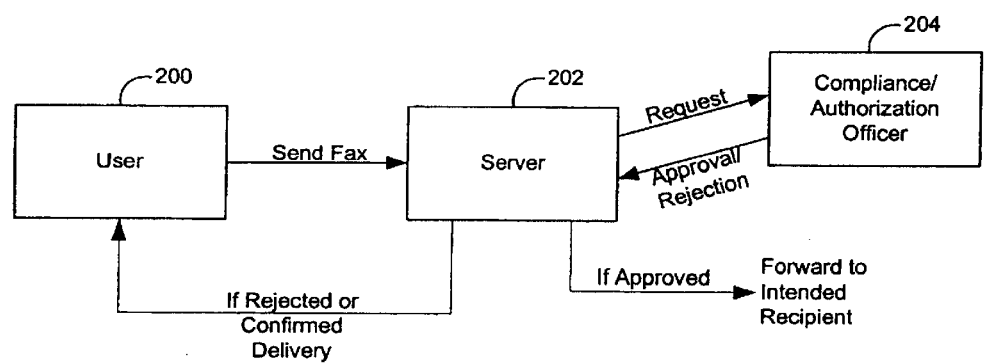
FIG. 10 is a simplified block diagram illustrating an exemplary application in accordance with the present invention.

The present invention as described above can be deployed in many different applications. FIG. 10 is a simplified block diagram illustrating an exemplary application in accordance with the present invention. As shown in FIG. 10, a user 200 faxes a document using the system 5 as described above. The faxed document is received by a server 202 and put in a processing queue to await processing. When the faxed document is processed, an email generated based on the faxed document is forwarded to a compliance/authorization officer 204. The email may be delivered to the compliance/authorization officer 204 using a number of different methods; but preferably, the email is delivered through a secure website or a virtual private network. In this particular application, the compliance/authorization officer 204 reviews the email to determine if it is allowed to be sent to its intended recipient. After the email has been reviewed, the compliance/authorization officer 204 relays its approval/rejection back to the server 202 for further actions. If an approval is given, then the server 202 forwards the email to the intended recipient. Optionally, a confirmation for delivery may be forwarded to the user 200. On the other hand, if a rejection is given, then the server 202 prevents the email from being sent to the intended recipient and informs the user 200 of the actions taken. Based on the disclosure provided herein, a person of ordinary skill in the art will know of other ways and/or manners to apply the present invention.

In an alternative exemplary embodiment, the system 5 is capable of handling inputs having different types of electronic formats. For example, instead of a user sending a document via a fax machine, the user may choose to first use a scanner to scan the document into a scanned image. The scanned image of the document is then forwarded to the fax server 22. Depending on the scanning technology used to produce the scanned image, the fax server 22 accordingly converts the scanned image for processing as described above. Based on the disclosure and teachings provided herein, a person of ordinary skill in the art will be able to implement the present invention to handle inputs with different types of electronic formats.

In summary, the method and apparatus of the present invention permits a user to, among other things, send an e-mail from any standalone fax machine; receive a fax from another without requiring the user to have previously procured and distributed a unique and predefined (i.e., one-to-one fax number to email relationship) fax number; and send a fax from an email by logging onto a web server provided by a centralized operating center.

Although the invention has been described in terms of preferred methods and structure, it will be obvious to those skilled in the art that many modifications and alterations may be made to the disclosed embodiments without departing from the invention. Hence, these modifications and alterations are intended to be considered as within the spirit and scope of the invention as defined by the appended claims.

What is claimed is:

1. A system for transmitting a facsimile or scanned image to an email destination, comprising:
   a first server configured to receive the facsimile or scanned image from a transmitting device, the facsimile or scanned image including an email cover page having an email address designating the email destination and one or more selectable options;
   a character recognizer in communication with the first server and configured to identify the email address from the email cover page and determine if one or more options have been selected;
   a format converter in communication with the first server and configured to convert the facsimile or scanned image to an email; and
   a second server configured to perform one or more actions with respect to the email if it has been determined that one or more options have been selected, the second server further configured to deliver the email to the email destination designated by the email address.

2. The system of claim 1 wherein the second server is further configured to generate a link for the email and forward the link to a recipient; and
   wherein when the link is activated by the recipient, the second server authenticates the recipient to ensure that the recipient is the intended recipient of the email.

3. The system of claim 1 wherein the second server is further configured to forward the entail to an authorization officer for review; and
   wherein the second server delivers the email to the email destination designated by the email address only upon approval by the authorization officer.

4. The system of claim 1 wherein the one or more actions with respect to the email include archiving the email.

5. The system of claim 1 wherein the one or more actions with respect to the email include formatting the email in a specific format.

6. The system of claim 1 wherein the transmitting device includes a facsimile protocol compliant communication device.

7. The system of claim 1 wherein the transmitting device includes a scanning device.

8. The system of claim 1 wherein the email cover page further includes an alias, the alias representing a distribution list having one or more email addresses; and
   wherein the second server forwards copies of the email to each one of the email addresses in the distribution, list represented by the alias.

9. The system of claim 1 wherein the email cover page is a label attached to a top page of the facsimile or scanned image.

10. The system of claim 1 wherein the email cover page includes a duplicate instance of the email address.

11. The system of claim 10 wherein the duplicate instance of the email address is encoded in bar code form on the email cover page.

12. The system of claim 1 wherein some or all of the information contained in the facsimile or scanned image is not included as part of the email.

13. The system of claim 12 wherein the some or all of the information contained in the facsimile or scanned image includes a facsimile number used to forward the facsimile to the first server.

14. The system of claim 1 wherein the second server is further configured to generate a confirmation page in response to successful transmission of the email to the email destination.

15. The system of claim 14 wherein the confirmation page includes one or more thumbnail sketches corresponding to one or more pages of the facsimile or scanned image.

16. The system of claim 14 wherein the confirmation page is forwarded to a sender of the facsimile or scanned image.

17. The system of claim 14 wherein the confirmation page is forwarded to an archive location.

18. The system of claim 14 wherein the confirmation page is formatted in a facsimile format.

19. The system of claim 14 wherein the confirmation page is formatted in an email or scanned format.

20. The system of claim 1 wherein additional information is included in the email depending on information contained in the email cover page.

21. The system of claim 20 wherein the additional information includes information that is specific to sender of the facsimile or scanned image.

22. The system of claim 20 wherein the additional information includes information that is specific to a recipient of the email.

23. The system of claim 21 wherein the information that is specific to the sender of the facsimile or scanned image includes information that is generated in response to past activities of the sender.

24. A system for transmitting a facsimile or scanned image to an email destination, comprising:
   a first server configured to receive the facsimile or scanned image from a transmitting device, the facsimile or scanned image including an email cover page having an email address designating the email destination;
   a character recognizer in communication with the first server and configured to identify the email address from the email cover page;

a format converter in communication with the first server and configured to convert the facsimile or scanned image to an email; and a second server configured to generate a link to the email and forward the link to a recipient;

wherein upon the recipient activating the link, the second server authenticates the recipient to ensure that the recipient is the intended recipient of the email.

25. The system of claim 24 wherein the email cover page further includes one or more selectable options;

wherein the character recognizer is further configured to determine if one or more options have been selected; and wherein the second server is further configured to perform one or more actions with respect to the email if it has been determined that one or more options have been selected.

26. The system of claim 24 wherein the email is retrieved by the recipient in a secure manner.

27. The system of claim 24 wherein the one or more actions with respect to the email include archiving the email.

28. The system of claim 24 wherein the one or more actions with respect to the email include formatting the email in a specific format.

29. The system of claim 24 wherein the transmitting device includes a facsimile protocol compliant communication device.

30. The system of claim 24 wherein the transmitting device includes a scanning device.

31. The system of claim 24 wherein the email cover page further includes an alias, the alias representing a distribution list having one or more email addresses; and wherein the second server generates a corresponding link for each one of the email addresses in the distribution list represented by the alias and forwards the corresponding links to email destinations designated by the email addresses in the distribution list.

32. The system of claim 24 wherein the email cover page is a label attached to a top page of the facsimile or scanned image.

33. The system of claim 24 wherein the email cover page includes a duplicate instance of the email address.

34. The system of claim 33 wherein the duplicate instance of the email address is encoded in bar code form on the email cover page.

35. The system of claim 24 wherein some or all of the information contained in the facsimile or scanned image is omitted from the email.

36. The system of claim 35 wherein the some or all of the information contained in the facsimile or scanned image includes a facsimile number used to forward the facsimile or scanned image to the first server.

37. The system of claim 24 wherein the second server is further configured to generate a confirmation page in response to successful forwarding of the link to the email destination.

38. The system of claim 37 wherein the confirmation page includes one or more thumbnail sketches corresponding to one or more pages of the facsimile or scanned image.

39. The system of claim 37 wherein the confirmation page is forwarded to a sender of the facsimile or scanned image.

40. The system of claim 37 wherein the confirmation page is forwarded to an archive location.

41. The system of claim 37 wherein the confirmation page is formatted in a facsimile format.

42. The system of claim 37 wherein the confirmation page is formatted in an email or scanned format.

43. The system of claim 24 wherein additional information is included in the email depending on information contained in the email cover page.

44. The system of claim 43 wherein the additional information includes information that is specific to sender of the facsimile or scanned image.

45. The system of claim 43 wherein the additional information includes information that is specific to a recipient of the email.

46. The system of claim 45 wherein the information that is specific to the sender of the facsimile or scanned image includes information that is generated in response to pest activities of the sender.

47. A method for transmitting a facsimile or scanned image to an email destination, comprising:

receiving the facsimile or scanned image from a transmitting device, the facsimile or scanned image including an email cover page having an email address designating the email destination and one or more selectable options;

extracting the email address from the email cover page;

converting the facsimile or scanned image into an email;

determining whether the one or more selectable options are selected;

performing one or more actions with respect to the email if the one or more selectable options are selected; and forwarding the email to the email destination designated by the email address.

48. The method of claim 47 further comprising:

generating a link for the email;

forwarding the link to a recipient; and upon activation of the link by the recipient, authenticating the recipient; and upon authenticating the recipient, allowing the recipient to access the email.

49. The method of claim 47 wherein the one or more actions with respect to the email include archiving the email.

50. The method of claim 47 wherein the one or more actions with respect to the email include formatting the email in a specific format.

51. The method of claim comprising:

extracting an alias from the email cover page;

analyzing the alias to derive a distribution list having one or more email addresses; and forwarding copies of the email to each one of the email addresses in the distribution list.

52. The method of claim 47 further comprising:

including a duplicate instance of the email address in the email cover page.

53. The method of claim 52 further comprising:

encoding the duplicate instance of the email address in bar code form on the email cover page.

54. The method of claim 47 further comprising:

omitting some or all of the information contained in the facsimile or scanned image from the email.

55. The method of claim 54 wherein the some or all of the information contained in the facsimile or scanned image includes a facsimile number used by the transmitting device to forward the facsimile or scanned image.

56. The method of claim 47 further comprising:

generating a confirmation page in response to successful transmission of the email to the email destination.

57. The method of claim 56 wherein the confirmation page includes one or more thumbnail sketches corresponding to one or more pages of the facsimile or scanned image.

58. The method of claim 47 further comprising:

incorporating additional information into the email depending on information contained in the email cover page.

59. The method of claim 58 wherein the additional information includes information that is specific to sender of the facsimile or scanned image.

60. The method of claim 58 wherein the additional information includes information that is specific to a recipient of the email.

61. The method of claim 59 wherein the information that is specific to the sender of the facsimile or scanned image includes information that is generated in response to past activities of the sender.

62. A system for monitoring transmission of facsimiles or scanned images, comprising:

a first server configured to receive a facsimile or scanned image from a user, the facsimile or scanned image including an email cover page having an email address designating an email destination;

a character recognizer in communication with the first server and configured to identify the email address from the email cover page;

a format converter in communication with the first server and configured to convert the facsimile or scanned image to an email; and a second server configured to forward the email to an authorizing agent, the authorizing agent having authority to determine whether the email is to be forwarded to the email destination designated by the email address, the second server further configured to receive a decision from the authorizing agent and take appropriate actions with respect to the email.

63. The system of claim 62 wherein the second server is configured to forward the email to the email destination designated by the email address if the decision is an approval.

64. The system of claim 63 wherein the second server is further configured to generate a link for the email and forward the link to the email destination designated by the email address if the decision is an approval; and wherein upon activation of the link, the second server forwards the email to the email destination designated by the email address.

65. The system of claim 64 wherein the second server is configured to determine whether activation of the link is authorized.

66. The system of claim 62 wherein the second server is configured to prevent the email from being delivered to the email destination designated by the email address if the decision is a rejection.

67. The system of claim 62 wherein the second server is further configured to generate and forward a notification message to the user informing the user of the actions taken with respect to the email.

68. A method for monitoring transmission of facsimiles or scanned images, comprising:

receiving a facsimile or scanned image from a user, the facsimile or scanned image including an email cover page having an email address designating an email destination;

extracting the email address from the email cover page;

converting the facsimile or scanned image to an email;

forwarding the email to an authorizing agent for review, the authorizing agent having authority to determine whether the email is to be forwarded to the email destination designated by the email address;

receiving a decision from the authorizing agent; and taking appropriate actions with respect to the email.

69. The method of claim 68 further comprising:

forwarding the email to the email destination designated by the email address if the decision is an approval.

70. The method of claim 68 further comprising:

generating a link for the email and forwarding the link to the email destination designated by the email address if the decision is an approval; and upon activation of the link, forwarding the email to the email destination designated by the email address.

71. The method of claim 70 further comprising:

determining whether activation of the link is authorized.

72. The method of claim 70 further comprising:

preventing the email from being delivered to the email destination designated by the email address if the decision is a rejection.

73. The method of claim 70 further comprising:

generating and forwarding a notification message to the user informing the user of the actions taken with respect to the email.

\* \* \* \* \*